(12) United States Patent
Iwasaki

(10) Patent No.: US 10,868,439 B2
(45) Date of Patent: Dec. 15, 2020

(54) POWER SUPPLY DEVICE

(71) Applicant: Yazaki Corporation, Tokyo (JP)

(72) Inventor: Katsuyuki Iwasaki, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 44 days.

(21) Appl. No.: 16/298,386

(22) Filed: Mar. 11, 2019

(65) Prior Publication Data
US 2019/0312456 A1 Oct. 10, 2019

(30) Foreign Application Priority Data

Apr. 10, 2018 (JP) ................. 2018-075176

(51) Int. Cl.
| H02J 9/06 | (2006.01) |
| H02J 7/00 | (2006.01) |
| H02J 1/10 | (2006.01) |
| H02J 7/34 | (2006.01) |
| B60L 1/10 | (2006.01) |
| B60R 16/033 | (2006.01) |

(52) U.S. Cl.
CPC ............... *H02J 9/061* (2013.01); *B60L 1/10* (2013.01); *H02J 1/10* (2013.01); *H02J 7/0068* (2013.01); *H02J 7/34* (2013.01); *B60R 16/033* (2013.01); *H02J 7/345* (2013.01)

(58) Field of Classification Search
CPC ...... H02J 9/061; H02J 1/10; H02J 7/34; H02J 7/0068; H02J 7/345; B60R 16/033
See application file for complete search history.

(56) References Cited

U.S. PATENT DOCUMENTS

| 5,564,737 A | 10/1996 | Ito et al. |
| 7,019,416 B2 * | 3/2006 | Sasaki ................... H02J 7/0063 307/115 |
| 8,803,486 B2 * | 8/2014 | Norimatsu .............. H02M 1/36 320/166 |
| 9,013,056 B2 | 4/2015 | Kageyama et al. |
| 9,515,554 B2 * | 12/2016 | Okaniwa .................. B60L 1/00 |

(Continued)

FOREIGN PATENT DOCUMENTS

| GB | 2545587 A | 6/2017 |
| JP | 7-81515 A | 3/1995 |

(Continued)

OTHER PUBLICATIONS

Communication dated May 29, 2019, from the European Patent Office in counterpart European Application No. 19164555.5.

*Primary Examiner* — Thomas J. Hiltunen
(74) *Attorney, Agent, or Firm* — Sughrue Mion, PLLC

(57) ABSTRACT

Effectively utilize a capacitor for supplying power to a load when a battery abnormality occurs. A power supply device for connecting to a battery and a load to which power is supplied from the battery includes: a capacitor; a first switch for switching a connection state between the battery and the capacitor; a second switch for switching a connection state between the capacitor and the load; and a control unit for detecting a state of charge of the capacitor and abnormality of the battery. When the abnormality of the battery is not detected, the control unit turns on the first switch and turns off the second switch when the capacitor is not charged, and maintains the first switch on after the capacitor is fully charged.

4 Claims, 4 Drawing Sheets

(56) References Cited

U.S. PATENT DOCUMENTS

| | | | |
|---|---|---|---|
| 9,856,847 B2* | 1/2018 | Sekiguchi | F02N 11/0866 |
| 10,029,572 B2* | 7/2018 | Sakatani | B60L 50/50 |
| 10,174,736 B2* | 1/2019 | Zhang | H02J 7/345 |
| 2005/0269870 A1 | 12/2005 | Ohashi et al. | |
| 2006/0072268 A1* | 4/2006 | Kang | H02J 9/005 |
| | | | 361/92 |
| 2016/0248247 A1 | 8/2016 | Origane et al. | |
| 2018/0354436 A1 | 12/2018 | Sato | |
| 2019/0052090 A1* | 2/2019 | Kobayashi | H02J 9/06 |
| 2019/0334375 A1* | 10/2019 | Wataru | H02J 1/082 |

FOREIGN PATENT DOCUMENTS

| | | |
|---|---|---|
| JP | 2014-45551 A | 3/2014 |
| JP | 5618024 B2 | 11/2014 |
| WO | 2017/141686 A1 | 8/2017 |

* cited by examiner

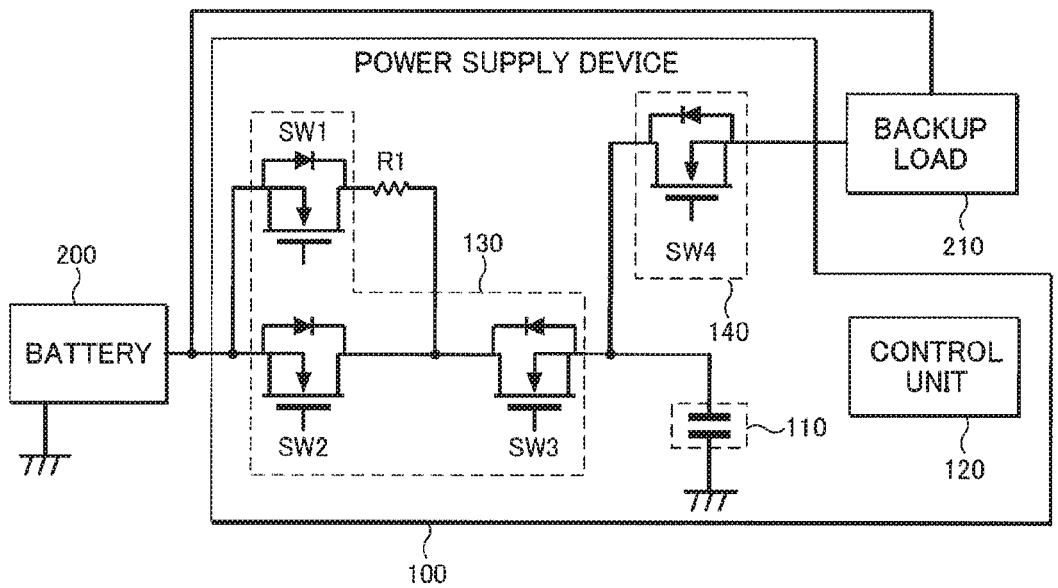

FIG.1

| | | WHEN CAPACITOR IS CHARGED | AFTER CHARGING, DURING BATTERY SUPPORT | AFTER CHARGING, WHEN THE BATTERY IS ABNORMAL | AFTER CHARGING, WHEN BACKUP LOAD POWER SUPPLY PRIORITY IS GIVEN |
|---|---|---|---|---|---|
| FIRST SWITCH | SW1 | ON | OFF | OFF | OFF |
| | SW2 | OFF→ON | ON | OFF | OFF |
| | SW3 | ON | ON | OFF | ON |
| SECOND SWITCH | SW4 | OFF | OFF | ON | OFF |
| EXAMPLE OF VEHICLE CONDITION | | AT STARTUP | WHILE NORMAL DRIVING | BATTERY FAULT WHILE DRIVING | COASTING WHILE DRIVING |

FIG.2

POWER SUPPLY DEVICE

TECHNICAL FIELD

The present invention relates to a power supply device for supplying power to a load when a battery abnormality occurs.

BACKGROUND ART

A vehicle such as an automobile includes a battery for supplying power to a load of an electronic control device, an electric device, or the like. As a battery, a 12 V lead storage battery is widely used. The loads to which electric power are supplied from the battery relate to functions such as running, steering, stopping, opening and closing of the door, etc., and includes a load (hereinafter referred to as a "backup load") that the power supply is preferably maintained even when the battery fails.

In the Patent Literature 1, as shown in FIG. 8, it is described that a capacitor 330 is previously charged by using a step-down circuit 320 connected to a battery 310 and when a control unit 360 detects abnormality of the battery 310, it controls a boost circuit 340 to boost the charge voltage of the capacitor 330 and supplies to a backup load 350.

PRIOR ART DOCUMENT

Patent Literature

Patent Literature 1: JP 5618024 B

SUMMARY OF INVENTION

Technical Problem

In the invention described in Patent Literature 1, the capacitor 330 is used only for the purpose of operating the backup load 350 when the battery 310 fails, and it cannot be said that the capacitor 330 is fully utilized effectively.

Accordingly, it is an object of the present invention to effectively utilize a capacitor for supplying power to a load when a battery abnormality occurs.

Solution to Problem

In order to solve the above problem, according to a first aspect of the present invention, there is provided a power supply device for connecting to a battery and a load to which power is supplied from the battery including:

a capacitor;

a first switch for switching a connection state between the battery and the capacitor;

a second switch for switching a connection state between the capacitor and the load; and a control unit for detecting a state of charge of the capacitor and abnormality of the battery, wherein when not detecting abnormality of the battery, the control unit turns on the first switch and turns off the second switch when the capacitor is not fully charged, and maintains the first switch on after the capacitor is fully charged.

Here, when detecting the abnormality of the battery, the control unit turns off the first switch and turns on the second switch.

Further, when a predetermined condition is satisfied, the control unit determines that priority is given to power supply to the load, and turns off the first switch and turns off the second switch.

Further, the first switch includes:

a second semiconductor switch and a third semiconductor switch connected in series between the battery and the capacitor; and a first semiconductor switch connected in parallel with the second semiconductor switch and connected in series with a resistor.

At this time, in the first semiconductor switch and the second semiconductor switch, an anode of a parasitic diode is disposed on a side of the battery, and in the third semiconductor switch, the anode of the parasitic diode is arranged on a side of the capacitor.

Effect of the Invention

According to the present invention, it is possible to effectively utilize the capacitor for supplying the power to the load when the battery abnormality occurs.

BRIEF DESCRIPTION OF DRAWINGS

FIG. 1 is a block diagram showing a configuration of a power supply device according to the present embodiment;

FIG. 2 is a diagram for explaining switches switching;

DESCRIPTION OF EMBODIMENTS

Figure 3:
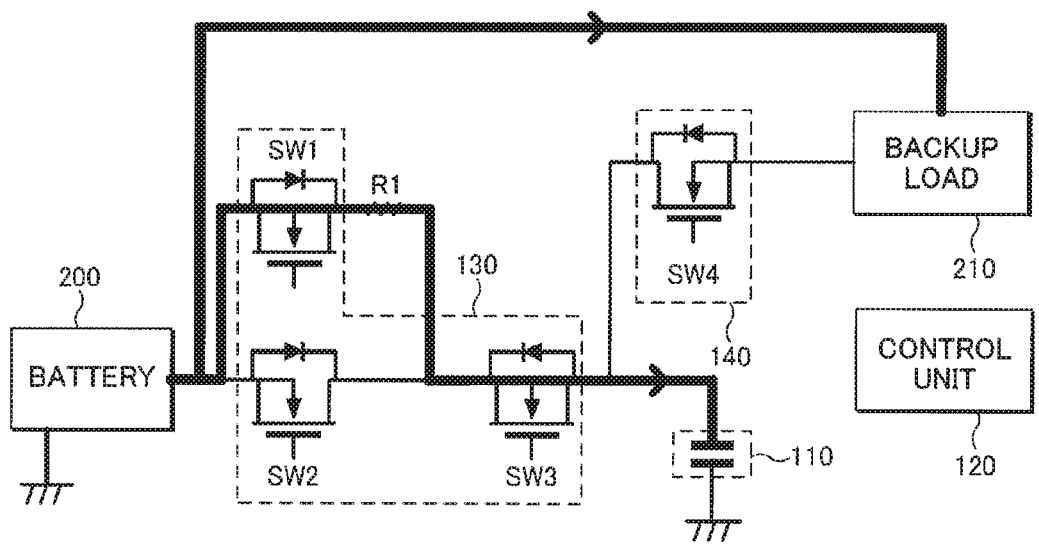
FIG. 3 is a diagram for explaining a power supply path at the time of charging a capacitor immediately after start-up.

Embodiments of the present invention will be described in detail with reference to the drawings. FIG. 1 is a block diagram showing a configuration of a power supply device 100 according to the present embodiment. In this figure, power is supplied to a backup load 210 from a battery 200.

The power supply device 100 is installed in a vehicle, for example, and is a device that supplies power to the backup load 210 when the battery 200 fails. Here, the backup load 210 is related to functions such as running, steering, stopping, door opening and closing, etc. and preferably the power supply is maintained even when the battery 200 is abnormal. Although not shown, general loads other than the backup load 210 are also connected to the battery 200. In addition, ISG (generator with motor function) etc. may be connected.

As shown in this figure, the power supply device 100 includes SW1, SW2, SW3, and SW4, each of which is constituted by a semiconductor switch, a resistor R1, a capacitor 110, and a control unit 120. The capacitor 110 can be, for example, an electric double layer capacitor (EDLC) having a long lifetime and high capacity. In addition, a DCDC converter may be arranged in front of the capacitor 110.

SW2, SW3, and the capacitor 110 are connected in series to the battery 200. In addition, in parallel with SW2, a series circuit of SW1 and resistor R1 is connected. Further, the capacitor 110 is connected to the backup load 210 via SW4.

In SW1 and SW2, the anode of the parasitic diode is disposed on the side of the battery 200, and the anode of the parasitic diode of SW3 is disposed on the side of the capacitor 110. That is, the cathodes of the SW2 and SW3 are connected to each other. Further, in SW4, the anode of the parasitic diode is arranged on the side of the backup load 210.

SW1, SW2 and SW3 function as a first switch 130 for switching the connection state between the battery 200 and the capacitor 110. SW4 functions as a second switch 140 for switching the connection state between the capacitor 110 and the backup load 210.

The control unit 120 monitors the state of the vehicle, the state of the battery 200, the charged state of the capacitor 110, and the like, and controls ON/OFF of SW1, SW2, SW3, and SW4. Incidentally, a control function may be provided for the SW4 that switches the connection state between the capacitor 110 and the backup load 210. In this case, when the SW4 detects abnormality of the battery 200, accident of the vehicle, etc., it controls so that the capacitor 110 and the backup load 210 are connected.

Next, the operation of the power supply device 100 having the above configuration will be described. FIG. 2 is a diagram for explaining on/off switching of each switch. When the capacitor 110 is charged, for example, when the vehicle is started, SW1 and SW3 are turned on to electrically connect the battery 200 with the capacitor 110. SW2 is turned off in the initial state. Further, the switch SW4 is turned off so as not to supply power from the capacitor 110 to the backup load 210.

FIG. 3 shows the current path (thick line) at this time. The backup load 210 is supplied with power from the battery 200. The capacitor 110 is charged by the path from the battery 200, via SW1, to SW3. Since the resistor R1 is connected to SW1, excessive inrush current to the capacitor 110 can be prevented.

Figure 4:
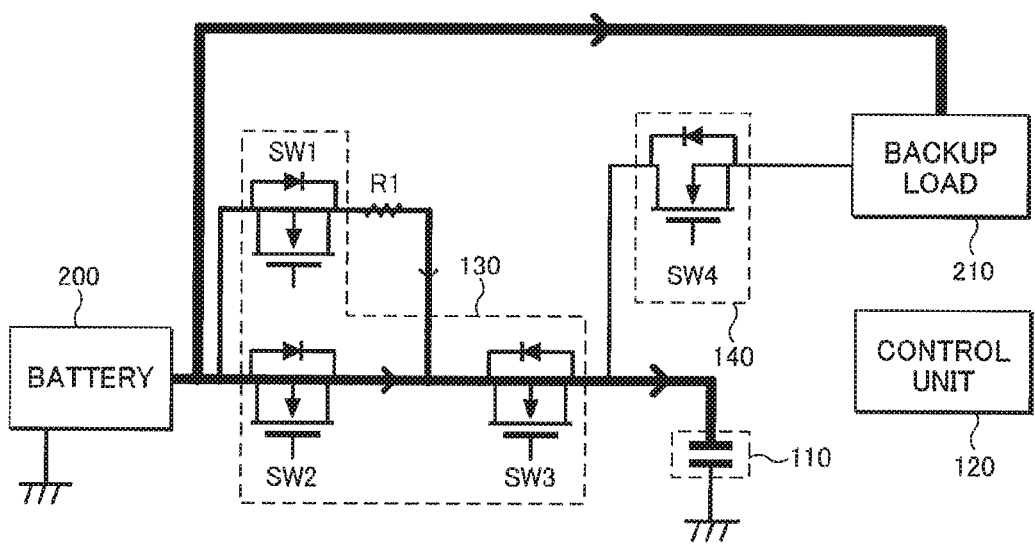
FIG. 4 is a diagram for explaining a power supply path during capacitor charging.
Figure 5:
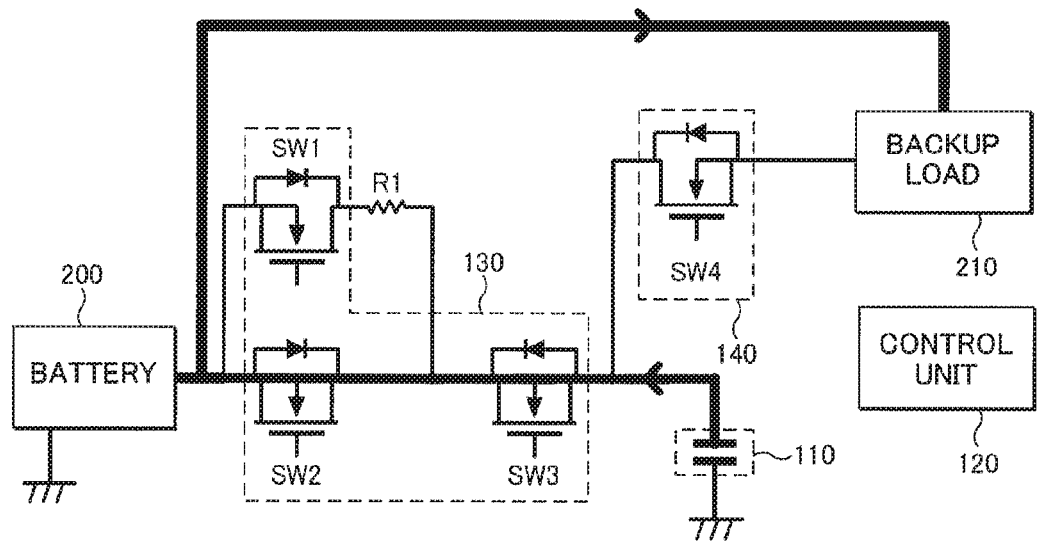
FIG. 5 is a diagram for explaining a power supply path during battery support.

SW2 is switched on after a lapse of a predetermined time since SW1 and SW3 are switched on. FIG. 4 shows the current path at this time. Since the main path for charging the capacitor 110 is switched from SW1 to SW2, power consumption at the resistor R1 can be suppressed.

Focusing on the connection relationships between the battery 200 and the capacitor 110 and between the capacitor 110 and the backup load 210 at the time of charging the capacitor 110, the first switch 130 for switching the connection state between the battery 200 and the capacitor 110 is turned on, and the second switch 140 for switching the connection state between the capacitor 110 and the backup with the load 210 is turned off.

During normal traveling or the like, the control unit 120 monitors the charging voltage of the capacitor 110, and when detecting that the charging is completed, switches the SW1 off. FIG. 4 shows the current path at this time. As shown in this figure, the current path from the capacitor 110 to the battery 200 via SW3, SW2 is formed. Incidentally, when the parasitic diode of SW3 is used, SW3 may be turned off.

The capacitor 110, which has been charged with this current path, can supply power to the backup load 210 and general loads (not shown) together with the battery 200. That is, the capacitor 110 also plays a role of supporting the battery 200. Thus, the capacitor 110 can be effectively used.

For example, in the case where a large current is instantaneously required for the load, the capacitor 110 releases electric charge, thereby preventing an excessive burden from being applied to the battery 200. However, it is assumed that the charge that can be supplied to the backup load 210 is reserved.

Focusing on the connection relationships between the battery 200 and the capacitor 110 and between the capacitor 110 and the backup load 210 after the charging of the capacitor 110, the first switch 130 for switching the connection state between the battery 200 and the capacitor 110 is turned on, and the second switch 140 for switching the connection state between the capacitor 110 and the backup load 210 is turned off. That is, in the present embodiment, the connection between the battery 200 and the capacitor 110 is maintained even after the capacitor 110 is charged.

Figure 6:
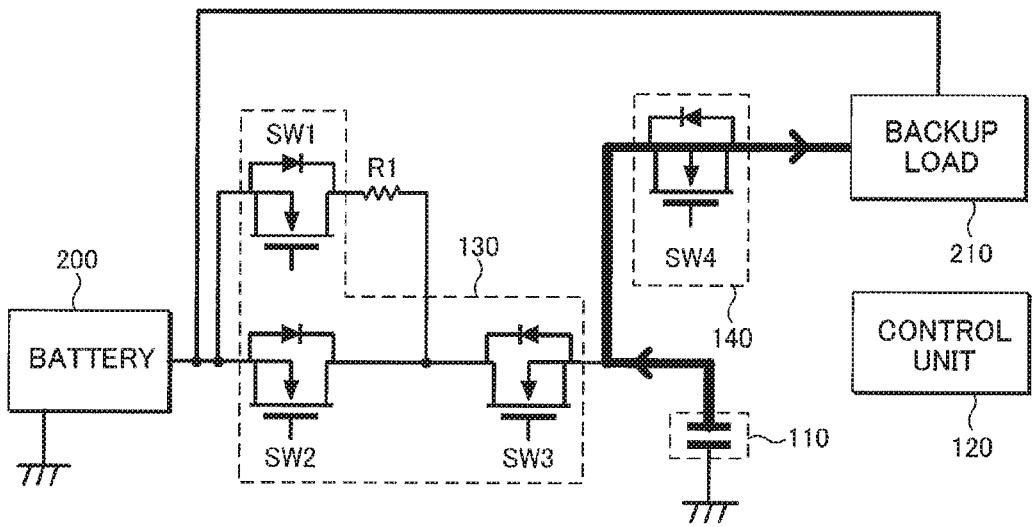
FIG. 6 is a diagram for explaining a power supply path at a time of a battery abnormality.

When an abnormality occurs in the battery 200 due to a battery failure or the like during traveling, the switches SW1, SW2, and SW3 are turned off to disconnect the path between the battery 200 and the capacitor 110, and the switch SW4 is turned on. FIG. 6 shows the current path at this time. The capacitor 110 supplies power to the backup load 210 instead of the battery 200 in which the abnormality has occurred.

Focusing on the connection relationships between the battery 200 and the capacitor 110 and between the capacitor 110 and the backup load 210 at the time of abnormality of the battery 200, the first switch 130 for switching the connection state between the battery 200 and the capacitor 110 is turned off, and the second switch 140 for switching the connection state between the capacitor 110 and the backup load 210 is turned on.

Figure 7:
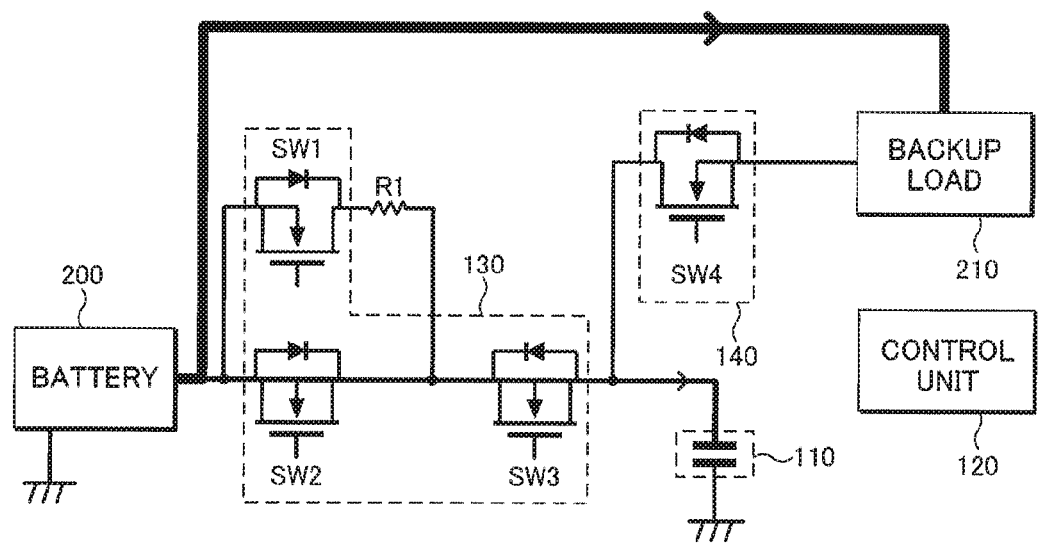
FIG. 7 is a diagram for explaining a power supply path at the time of giving priority to backup load power supply.
Figure 8:
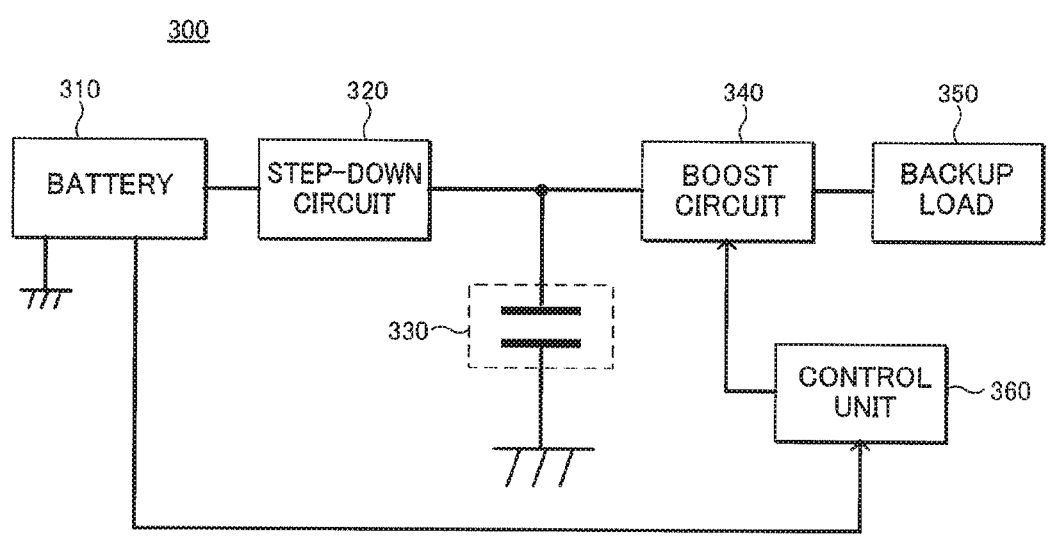
FIG. 8 is a diagram for explaining a capacitor that supplies power to a load when a power failure occurs.

In the case of giving priority to power supply to the backup load 210 at the time of performing coasting or the like after charging, SW1, SW2, and SW4 may be turned off and only SW3 may be turned on. Here, the coasting is a traveling operation in which the engine and the tire are disconnected from each other and the vehicle skids due to the inertia of the vehicle. The control unit 120 determines that priority is given to power supply to the backup load 210 when the vehicle enters a predetermined state such as coasting. FIG. 7 shows the current path at this time.

Due to this current path, the backup load 210 can receive power supply preferentially from the battery 200. Since SW3 is turned on, the capacitor 110 can be charged using the parasitic diode of SW2.

Focusing on the connection relationships between the battery 200 and the capacitor 110 and between the capacitor 110 and the backup load 210 in the case of giving priority to power supply to the backup load 210 after charging the capacitor 110, the first switch 130 for switching the connection state between the battery 200 and the capacitor 110 is turned off, and the second switch 140 for switching the connection state between the capacitor 110 and the backup load 210 is turned off. However, a current path from the battery 200 to the capacitor 110 is formed by the parasitic diode of the first switch 130.

As described above, according to the power supply device 100 of the present embodiment, since the first switch 130, which switches the connection state between the capacitor 110 that supplies power to the backup load 210 when the battery 200 is in an abnormal state and the battery 200, maintains on even after charging of the capacitor 110, the capacitor 110 can support the battery 200 so that the capacitor 110 is effectively used.

REFERENCE SIGNS LIST

100 Power supply device
110 Capacitor

120 Control unit
130 First switch
140 Second switch
200 Battery
210 Backup load

The invention claimed is:

1. A power supply device for connecting to a battery and a load to which power is supplied from the battery comprising:
a capacitor;
a first switch for switching a connection state between the battery and the capacitor;
a second switch for switching a connection state between the capacitor and the load; and
a control unit for detecting a state of charge of the capacitor and abnormality of the battery,
wherein when not detecting abnormality of the battery, the control unit turns on the first switch and turns off the second switch when the capacitor is not fully charged, and maintains the first switch on after the capacitor is fully charged,
wherein the first switch includes:
a second semiconductor switch and a third semiconductor switch connected in series between the battery and the capacitor; and
a first semiconductor switch connected in parallel with the second semiconductor switch and connected in series with a resistor; and
wherein in the first semiconductor switch and the second semiconductor switch, an anode of a parasitic diode is disposed on a side of the battery, and in the third semiconductor switch, the anode of the parasitic diode is arranged on a side of the capacitor.

2. The power supply device as claimed in claim 1, wherein when detecting the abnormality of the battery, the control unit turns off the first switch and turns on the second switch.

3. The power supply device as claimed in claim 1, wherein when a predetermined condition is satisfied, the control unit determines that priority is given to power supply to the load, and turns off the first switch and turns off the second switch.

4. The power supply device as claimed in claim 2, wherein when a predetermined condition is satisfied, the control unit determines that priority is given to power supply to the load, and turns off the first switch and turns off the second switch.

* * * * *